United States Patent
Zhang et al.

(10) Patent No.: US 12,481,517 B1
(45) Date of Patent: Nov. 25, 2025

(54) ARTIFICIAL INTELLIGENCE (AI) AGENTS ORCHESTRATION

(71) Applicant: PROACTIVE AI LAB, INC., Dover, DE (US)

(72) Inventors: Maria Renhui Zhang, Los Altos Hills, CA (US); Chuan Ren, Los Altos, CA (US); Mikita Dvornik, Montreal (CA); Xue Liu, Montreal (CA); Xi Chen, Brossard (CA); Timothy Howes, Mountain View, CA (US)

(73) Assignee: Proactive AI Lab, Inc., Dover, DE (US)

( * ) Notice: Subject to any disclaimer, the term of this patent is extended or adjusted under 35 U.S.C. 154(b) by 0 days.

(21) Appl. No.: 19/097,220

(22) Filed: Apr. 1, 2025

(51) Int. Cl.
  *G06F 9/455* (2018.01)
  *G06F 9/50* (2006.01)
  *G06F 40/30* (2020.01)

(52) U.S. Cl.
  CPC ...... *G06F 9/45504* (2013.01); *G06F 9/45558* (2013.01); *G06F 9/5083* (2013.01); *G06F 40/30* (2020.01); *G06F 2009/45562* (2013.01)

(58) Field of Classification Search
  None
  See application file for complete search history.

(56) References Cited

U.S. PATENT DOCUMENTS

2024/0089248 A1\* 3/2024 Konduru ............... H04L 63/083

\* cited by examiner

*Primary Examiner* — Wynuel S Aquino
(74) *Attorney, Agent, or Firm* — Sheppard Mullin Richter & Hampton LLP

(57) ABSTRACT

An AI orchestration system dynamically manages multiple artificial intelligence (AI) agents within a cloud computing environment to efficiently process user requests. A model orchestration subsystem determines whether a request is handled locally using a domain-specific database or by invoking one or more AI agents. The system maintains AI agents in active and inactive states, provisioning computing resources for inactive agents as needed. Real-time model metrics guide the selection of target AI agents, and if a degrading performance trend is detected, the system preemptively spins up additional AI instances. The system provisions processor cycles, memory, and network bandwidth through a cloud-based resource manager, instantiates containerized execution environments or virtual machines, and performs automated load balancing among AI instances.

20 Claims, 6 Drawing Sheets

ARTIFICIAL INTELLIGENCE (AI) AGENTS ORCHESTRATION

TECHNICAL FIELD

The present disclosure relates generally to artificial intelligence (AI) systems and, more particularly, to a system and method for orchestrating multiple AI agents to provide user-facing services, wherein user requests are dynamically routed, processed, and managed among the AI agents.

BACKGROUND

The adoption of AI-powered services has grown rapidly in customer-facing applications across various industries, including retail, logistics, e-commerce, and customer support. Traditional AI systems often rely on large, monolithic models designed to handle a broad range of tasks. However, such models present several drawbacks. Developing a single, comprehensive AI model capable of processing all types of tasks requires significant amounts of training data, extended training periods, and extensive computational resources. Furthermore, large models tend to be less accurate for domain-specific tasks and are more prone to errors such as hallucination, where the model generates irrelevant or misleading outputs.

In contrast, using a group of specialized AI agents offers a more effective and scalable approach. Each AI agent can be fine-tuned for a specific task or domain, such as natural language understanding, inventory management, product recommendation, image generation, or customer query handling. This modular design allows for improved accuracy, reduced training time, and efficient resource utilization. However, the orchestration of multiple AI agents introduces new technical challenges, including determining how to extract user intent, identify the appropriate AI agent(s) for a given user request, route tasks efficiently, and select or aggregate responses from multiple agents in real time.

Additionally, customer-facing AI systems must integrate seamlessly with existing enterprise systems, such as Point of Sale (POS) systems, back-end databases, warehouse management systems, and chatbots. These integrations often require standardized input/output formats, effective retrieval of domain-specific data, and a dynamic decision-making process for invoking local processing or external AI agents. Therefore, there exists a need for a robust and scalable system capable of managing and orchestrating multiple specialized AI agents to address diverse user requests efficiently and effectively, while maintaining accuracy, cost-efficiency, and responsiveness.

SUMMARY

Various embodiments of the present specification may include systems and methods for AI-agent orchestration.

In one general aspect, the system includes a unified user interface for receiving a user request in one of a plurality of formats. The system further includes a Large Language Model (LLM) configured to extract user intent from the user request. Additionally, the system incorporates a domain-specific database constructed based on domain-specific materials. The system also comprises a plurality of AI agents instantiated as containerized instances within a cloud computing environment, wherein a first subset of the plurality of AI agents is maintained in an active state, each provisioned with processor cycles, memory, and network bandwidth to handle real-time user requests, and a second subset of the plurality of AI agents is maintained in an inactive state, wherein execution containers or virtual machines for the second subset require initialization before invocation.

The system further includes a model orchestration subsystem implemented as software instructions executable by one or more processors. The model orchestration subsystem is configured to determine, based on the user intent extracted by the LLM, whether the user request should be processed locally using the domain-specific database or by invoking one or more of the plurality of AI agents. If the request is processed by invoking one or more of the plurality of AI agents, the model orchestration subsystem is further configured to identify one or more candidate AI agents based on the user intent; retrieve model metrics of the identified candidate AI agents, wherein real-time model metrics apply to active AI agents and historical model metrics apply to inactive AI agents; and identify one or more target AI agents based on the retrieved model metrics.

For a first target AI agent, the model orchestration subsystem determines whether the agent is in an active or inactive state. If the first target AI agent is inactive, the system initiates a spin-up process that includes provisioning processor cycles, memory, and network bandwidth using a cloud-based resource manager; instantiating a containerized execution environment for the first target AI agent; loading a pre-trained model into the execution environment; and monitoring the initialization state of the AI agent using system telemetry data until the agent reaches a ready state.

Once the first target AI agent is active or successfully initialized, the model orchestration subsystem constructs and sends one or more prompts to the identified target AI agents, generates a response based on the returned data from the AI agents, and returns the response through the unified user interface.

For a second target AI agent among the identified target AI agents that is in an active state, the model orchestration subsystem determines whether real-time metrics indicate a degrading trend toward a predefined threshold. If a degradation trend is detected, the system preemptively initiates the spin-up of an additional instance of the second target AI agent by provisioning processor cycles, memory, and network bandwidth and instantiating a containerized execution environment associated with the additional instance of the second target AI agent. The system then executes automatic load balancing among all active instances of the second target AI agent.

Other embodiments of this system include corresponding computer systems, apparatus, and computer programs recorded on one or more computer storage devices, each configured to perform the specified actions.

Implementations may include one or more of the following features. When processing the user request locally, the model orchestration subsystem constructs, using the LLM, a database query based on the user request, executes the database query against the domain-specific database to obtain a query result, and constructs, using the LLM, a natural language response based on the query result.

The automatic load-balancing process retrieves real-time system telemetry, including response latency, request queue length, throughput, and resource utilization of each active instance of the second target AI agent. Based on this telemetry, the system dynamically reconfigures API gateway load distribution settings or reallocates AI inference endpoints to redistribute processing loads across active instances of the second target AI agent.

The system also includes a translation layer configured to standardize input and output schemas for interacting with the plurality of AI agents. The model orchestration subsystem uses this translation layer to send one or more prompts to the identified AI agents and receive the returned data from those agents.

The system further includes a training module for training the LLM to extract user intent from user requests. The training module is configured to receive a dataset containing user queries and corresponding ground truth intent labels representing a diverse range of query formats relevant to a target domain. The dataset is preprocessed by normalizing query formats, tokenizing textual data, and removing inconsistencies, resulting in a standardized dataset for training. The training module fine-tunes a pre-trained LLM using this dataset by optimizing model parameters to minimize a loss function representing the difference between predicted intent labels and the corresponding ground truth labels. This process adapts the pre-trained LLM to domain-specific intent extraction tasks.

The LLM is further augmented using a retrieval-augmented generation (RAG) database. The training module creates embeddings for each user query and intent label in the dataset, encoding semantic relationships between queries and intents. These embeddings are stored in a vector database to facilitate similarity-based retrieval of relevant intent examples during inference. During training, the system generates an embedding representing the semantic meaning of a user query and retrieves a set of semantically similar intent examples based on a similarity metric. Performance metrics such as precision, recall, and F1-score are calculated based on the predicted user intent and the retrieved intent examples. The LLM is iteratively refined based on these performance metrics.

To generate a response, the model orchestration subsystem evaluates returned data from the AI agents using relevance to the user request, confidence scores, response latency, and output completeness. The system selects the returned data with the highest evaluation score as the final response. If multiple AI agents return responses, the system combines them by removing redundant information, aggregating non-overlapping portions, and synthesizing a unified response using the LLM.

To determine the target AI agents based on real-time model metrics, the model orchestration subsystem categorizes the user request into one of multiple context categories, each indicative of user intent, task urgency, or task complexity. The system adjusts the weighting of model metrics based on the context category, dynamically prioritizing certain metrics.

To classify the user request, the system applies a machine-learning-based intent classification model that analyzes textual content, input modality, temporal patterns, and user interaction history. The LLM extracts semantic and contextual embeddings from the request to identify latent attributes. The system trains a context classification model using a labeled dataset of user requests and their corresponding context categories. Based on this analysis, the system predicts a context category for the user request and adjusts real-time model metric scaling accordingly.

Implementations of these techniques may include hardware, a method or process, or a computer-readable storage medium.

These techniques may be implemented in various forms, including as hardware, methods or processes, or computer-readable media. The result is a system that orchestrates multiple AI agents in a flexible, adaptive manner, allowing users to seamlessly interact with domain-specific databases or dynamically selected AI agents.

DETAILED DESCRIPTION

Figure 1:
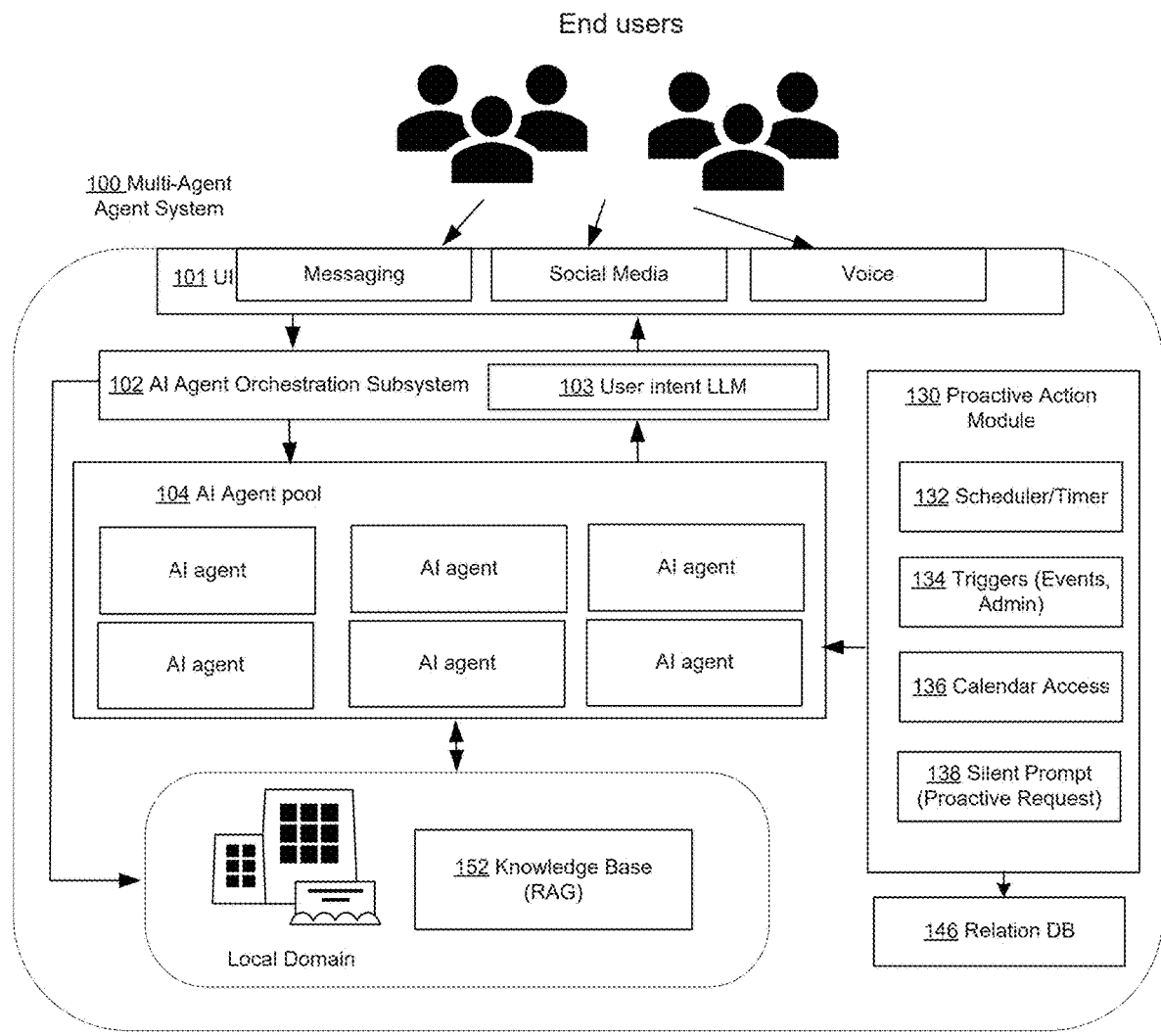
FIG. 1 illustrates an example system involving multiple AI agents and an AI agent orchestration subsystem, in accordance with some embodiments.

The present disclosure provides a system for orchestrating multiple artificial intelligence (AI) agents to handle diverse user requests efficiently. The system addresses the technical challenges associated with managing multiple fine-tuned AI agents by leveraging an orchestration subsystem configured to dynamically route user requests to appropriate processing paths. The orchestration subsystem determines whether a user request can be handled locally using a domain-specific database or requires external processing by one or more specialized AI agents. This determination is based on user intent extracted from the request using a Large Language Model (LLM).

To facilitate seamless integration with existing enterprise systems, such as POS systems, back-end databases, and warehouse management systems, the system includes a translation layer that standardizes input and output schemas for interacting with multiple AI agents. By using a unified schema, the translation layer ensures interoperability across AI agents that may have differing input requirements and response formats.

For local processing, the orchestration subsystem constructs a database query using the LLM and retrieves relevant data from the domain-specific database. The retrieved data is then converted into a natural language response tailored to the user's request. For tasks requiring external AI agents, the orchestration subsystem identifies candidate AI agents by performing vector-based similarity matching between the extracted user intent and the functional descriptions of the agents. Real-time model metrics, such as latency, cost, availability, and response quality, are then used to dynamically select the most appropriate target AI agents.

To generate a response, the system provides multiple strategies: it may select the most relevant response from the AI agents based on predefined criteria (e.g., confidence, relevance, or latency) or combine responses by aggregating complementary information and removing redundancies. These strategies ensure that the final response is accurate, comprehensive, and contextually aligned with the user request.

In addition, the system includes mechanisms for training the LLM to extract user intent more effectively. A training module fine-tunes the LLM using a domain-specific dataset comprising user queries and corresponding intent labels. Retrieval-Augmented Generation (RAG) techniques are applied to improve performance by retrieving semantically similar examples during both training and inference, ensuring high precision in user intent extraction.

The system further introduces dynamic context-based scaling of real-time model metrics to optimize AI agent selection for specific tasks. For instance, latency may be prioritized in real-time interactions, whereas cost-efficiency may take precedence in asynchronous tasks. A context classification model, trained using machine learning techniques, predicts the context of the user request to guide this optimization.

By orchestrating specialized AI agents, dynamically routing tasks, and integrating with existing systems, the disclosed system provides a scalable, accurate, and efficient solution for AI-powered customer-facing services. This modular approach avoids the limitations of monolithic AI models while enabling flexible, context-aware task management.

FIG. 1 illustrates an example multi-agent system 100 involving multiple AI agents and an AI agent orchestration subsystem, in accordance with some embodiments. The various configurations and components of the multi-agent system 100 in FIG. 1 are merely for illustrative purposes, and do not limit the application of the system to other suitable configurations or other environments. Depending on the implementation, the multi-agent system 100 may have more, fewer, or alternative components to achieve desired functions.

Front-End Unified User Interface

In some embodiments, the multi-agent system 100 may include a front-end unified user interface (UI) 101 for exchanging data with end users. The UI 101 may include a text message-based user interface; an image-based user interface; a social media-based user interface; a voice-based user interface; a mobile application-based user interface; or a web-based user interface. In recent years, more people have started to prefer using text-based user interfaces to interact with businesses, such as messaging, in-app messaging, and direct messaging on social media, over making phone calls. Data also shows that text-based user prompts lead to significantly fewer mistakes than voice-based interfaces. Therefore, a preferred implementation of the multi-agent system 100 includes a text-based user interface. In some embodiments, the text-based prompts may also originate from a speech-to-text engine on the user's device side.

User Intent LLM in the AI Agent Orchestration Layer

In some embodiments, the multi-agent system 100 may include an AI agent orchestration subsystem 102 that is responsible for dynamically routing user requests to appropriate AI agents, integrating real-time model metrics for agent selection, and managing the aggregation of responses to ensure efficient and accurate task handling. This AI agent orchestration subsystem 102 may employ a multi-modal model that integrates different types of data to generate a unified text-based prompt for the downstream AI agents (in the AI agent pool 104).

In some embodiments, the AI agent orchestration subsystem 102 may include a fine-tuned LLM, referred to as the user intent LLM 103, to parse user inputs and extract user intent. The user inquiry or request is tokenized and analyzed for sentiment and contextual information using the user intent LLM 103. When processing image inputs, the AI agent orchestration subsystem 102 may leverage computer vision techniques, such as convolutional neural networks (CNNs), to parse the image, extract relevant features, and, if the image contains text, apply optical character recognition (OCR) to extract the text. The extracted features can then be used to generate a prompt for the user intent LLM 103 to identify the user intent. For audio inputs, the AI agent orchestration subsystem 102 may employ automatic speech recognition (ASR) techniques to convert spoken words into text. This process includes noise reduction and speaker diarization to ensure clarity and accuracy.

The user intent LLM 103 serves as the primary mechanism in the AI agent orchestration subsystem 102 for extracting and understanding user intent across diverse input formats, including text, images, audio, and video. The extracted user intent is critical for the system's efficient operation, enabling precise routing of requests, determining whether a task can be handled locally using a domain-specific database or requires the invocation of specialized AI agents, and dynamically adjusting the weighting of model metrics during the AI agent selection process (as discussed in further detail below).

The training process for the user intent LLM 103 may start with the acquisition of a dataset comprising a diverse range of user queries paired with corresponding ground truth intent labels. This dataset is designed to reflect the specific domain of application (e.g., coffee shops, fashion retail, pizza delivery), capturing a variety of query formats, phrasings, and contextual variations to ensure that the LLM can effectively generalize across different scenarios. Possible sources for this training data include logs from customer interactions, such as chat transcripts, support tickets, email communications, and voice-to-text transcriptions from call centers. Additionally, publicly available datasets, such as e-commerce question-answering datasets, or synthetically generated data can supplement real-world examples.

For example, in an e-commerce setting, the dataset might include intents like "search for a product," "add to cart," "apply a discount code," or "track a shipment." In a coffee shop context, typical intents might involve "place an order," "customize a drink," or "check operating hours." For a pizza delivery service, the dataset could cover queries such as "order a pepperoni pizza," "check delivery time," or "update delivery address."

To ensure data consistency and quality, preprocessing methods may be applied, including tokenization, normalization, and removal of inconsistencies. For example, the preprocessing process for the training dataset of the user intent LLM 103 may begin with data cleaning and normalization, where the raw dataset is inspected for noise, inconsistencies, and irrelevant content.

Next, tokenization breaks queries into smaller units like words, subwords, or characters, depending on the model's architecture. For instance, "track my order" might become ["track," "my," "order"], and less common words like "untrackable" are segmented into ["un," "track," "able"]. Stopword removal eliminates non-essential words, such as "the" or "is," while lemmatization converts words into their base forms, ensuring consistent representation (e.g., "searching" to "search"). Intent label validation and alignment ensures queries are matched with accurate labels. Duplicate or conflicting labels are reconciled, and all intents are mapped to a standardized taxonomy. Mislabeling is corrected by referencing domain-specific knowledge, ensuring the dataset is consistent and reliable.

To enhance diversity, data augmentation generates variations of existing queries. Paraphrasing tools create alternative phrasings, synonyms replace key terms (e.g., "buy" becomes "purchase"), and intent expansion adds new examples to cover broader scenarios, such as extending "track my order" to include "where is my package?"

Once the dataset is prepared, the LLM is fine-tuned on the standardized dataset. The fine-tuning process involves adjusting the model's parameters to minimize a loss function that measures the difference between the predicted intent labels and the corresponding ground truth labels. Techniques such as early stopping and dropout may be applied during fine-tuning to prevent overfitting and improve the model's ability to generalize to unseen data. This process adapts the pre-trained LLM to the nuances of domain-specific intent extraction tasks, enabling it to handle complex and ambiguous queries with precision.

In some embodiments, the user intent LLM 103 is further augmented using a retrieval-augmented generation (RAG) database 152 to enhance its performance during inference. The RAG 152 integrates a vector database where embeddings of user queries and intent labels are stored. Each user query in the training dataset is transformed into a dense vector representation that encodes its semantic meaning, along with the corresponding intent label. These embeddings are indexed in the vector database to enable efficient similarity-based retrieval during both training and inference.

During the training phase, the system generates an embedding for a training query and retrieves a set of semantically similar intent examples from the vector database based on a similarity metric, such as cosine similarity. The retrieved examples are incorporated into the LLM's input to improve the contextual relevance of its predictions. The system evaluates the performance of the LLM by calculating metrics such as precision, recall, and F1-score, which measure the model's ability to extract accurate intents. These performance metrics guide an iterative refinement process, where the model's parameters are adjusted to address identified weaknesses, further enhancing its accuracy and robustness.

By combining supervised fine-tuning with the RAG 152, the training module ensures that the user intent LLM 103 achieves a high level of accuracy, scalability, and adaptability. This hybrid approach not only improves the model's ability to handle diverse and complex queries but also ensures that it can retrieve and leverage relevant historical examples to make more informed predictions.

Once the LLM generates an intent prediction, the predicted intent is mapped to a predefined label within the system's domain ontology. This mapping ensures that the extracted intent is actionable, enabling seamless interaction with downstream AI agents or local processing modules. For example, an intent labeled as "billing query" might invoke a financial troubleshooting agent, while "product recommendation" could activate an AI agent trained for personalized suggestions.

The performance of the user intent LLM 103 may be continuously monitored and refined through an iterative feedback loop. Automated testing pipelines evaluate precision, recall, and F1 scores on a held-out test set, identifying performance bottlenecks and areas for improvement. Real-world user feedback is also incorporated, allowing the system to dynamically adapt to new behaviors or emerging intents. For instance, if the system detects recurring errors in intent extraction for specific queries, it prioritizes similar examples during retrieval to refine future predictions.

To maintain relevance over time, the system may integrate mechanisms for real-time updates. As new user intents emerge or existing ones evolve, the dataset and embeddings are updated to reflect these changes. Regular model retraining ensures that the LLM adapts to shifting domain requirements while preserving backward compatibility through robust versioning controls. This dynamic update mechanism enables the LLM to remain accurate, responsive, and effective, even in rapidly changing environments.

AI Agent Pool

In some embodiments, the AI agent pool 104 may include a diverse set of fine-tuned AI agents, each designed to handle specific tasks or user requests. This diversity is key to achieving high accuracy and efficiency in processing various functionalities. Among these, certain AI agents are trained to perform the same functionality using different base models, leveraging the strengths of each model to optimize performance based on context. For instance, in text processing tasks like summarization or question answering, the AI agent pool 104 might include agents fine-tuned from GPT-4, Llama-2, or Gemini. Some base models are highly proficient in generating fluent and contextually rich responses, making them ideal for complex queries. Some other base models may offer efficiency in resource-constrained environments, or in tasks requiring text-to-text transformations. This redundancy ensures that the system can dynamically select an appropriate agent based on factors such as latency, cost, and task complexity.

The AI agent pool 104 may also include agents specialized in processing data across multiple formats, including text, voice, and images. For text processing, the AI agents might handle natural language understanding, entity or object recognition, or sentiment analysis. For voice inputs, the pool incorporates agents trained on automatic speech recognition (ASR) models to convert spoken language into text, with capabilities such as noise reduction and speaker diarization for clarity. Image-processing agents utilize advanced computer vision techniques, including convolutional neural networks (CNNs) and transformer-based architectures like Vision Transformers (ViT), to analyze visual data. These agents can perform tasks such as object detection, image classification, and optical character recognition (OCR) for extracting text from images.

In addition to handling specific functionalities and input formats, the AI agent pool 104 may further include agents trained to manage different aspects of a single user request. For instance, a request like "show me an image of a pink dress and recommend matching accessories" involves multiple tasks: retrieving relevant product images, generating recommendations for accessories, and presenting the results in a cohesive manner. The AI agent pool 104 may have agents that specialize in product search, recommendation generation, and multi-modal response synthesis. These agents work collaboratively, with each handling a specific aspect of the request, and their outputs are integrated by the orchestration subsystem to provide a comprehensive response.

In some embodiments, the AI agent pool 104 comprises a plurality of AI agents instantiated as containerized instances within a cloud computing environment. Each AI agent may be deployed within an execution environment that provides isolated computational resources, including processor cycles, memory, and network bandwidth, ensuring scalability and flexibility in AI agent management. The cloud computing environment may include container orchestration platforms such as Kubernetes, Docker Swarm, or cloud-based AI service platforms that support dynamic provisioning and management of AI agent instances.

In some embodiments, a subset of the AI agents in the AI agent pool 104 is maintained in an active state, where each active AI agent instance is allocated dedicated or shared computational resources to handle real-time user requests. These active AI agent instances continuously process incoming queries, execute AI inference tasks, and return results in response to user requests received via the unified user interface 101.

In some embodiments, another subset of AI agents in the AI agent pool 104 is maintained in an inactive state, where execution containers or virtual machines for these AI agents are not currently provisioned with processor cycles, memory, or network bandwidth. Instead, these inactive AI agents remain dormant until a request necessitates their activation. Maintaining a portion of AI agents in an inactive state optimizes cloud resource utilization, reducing costs while allowing rapid scalability when demand increases. When an inactive AI agent is required, a cloud-based resource manager dynamically provisions the necessary computational resources to instantiate a new instance of the AI agent, ensuring it becomes available for processing user requests.

This modular design of the AI agent pool 104 not only enhances the system's scalability but also improves its adaptability to complex and evolving user needs. By combining agents trained on diverse base models, supporting multi-modal data, and managing different aspects of user requests, the system ensures robust, accurate, and context-aware processing, enabling seamless interactions across customer-facing services.

AI Agent Orchestration Layer

Figure 2:
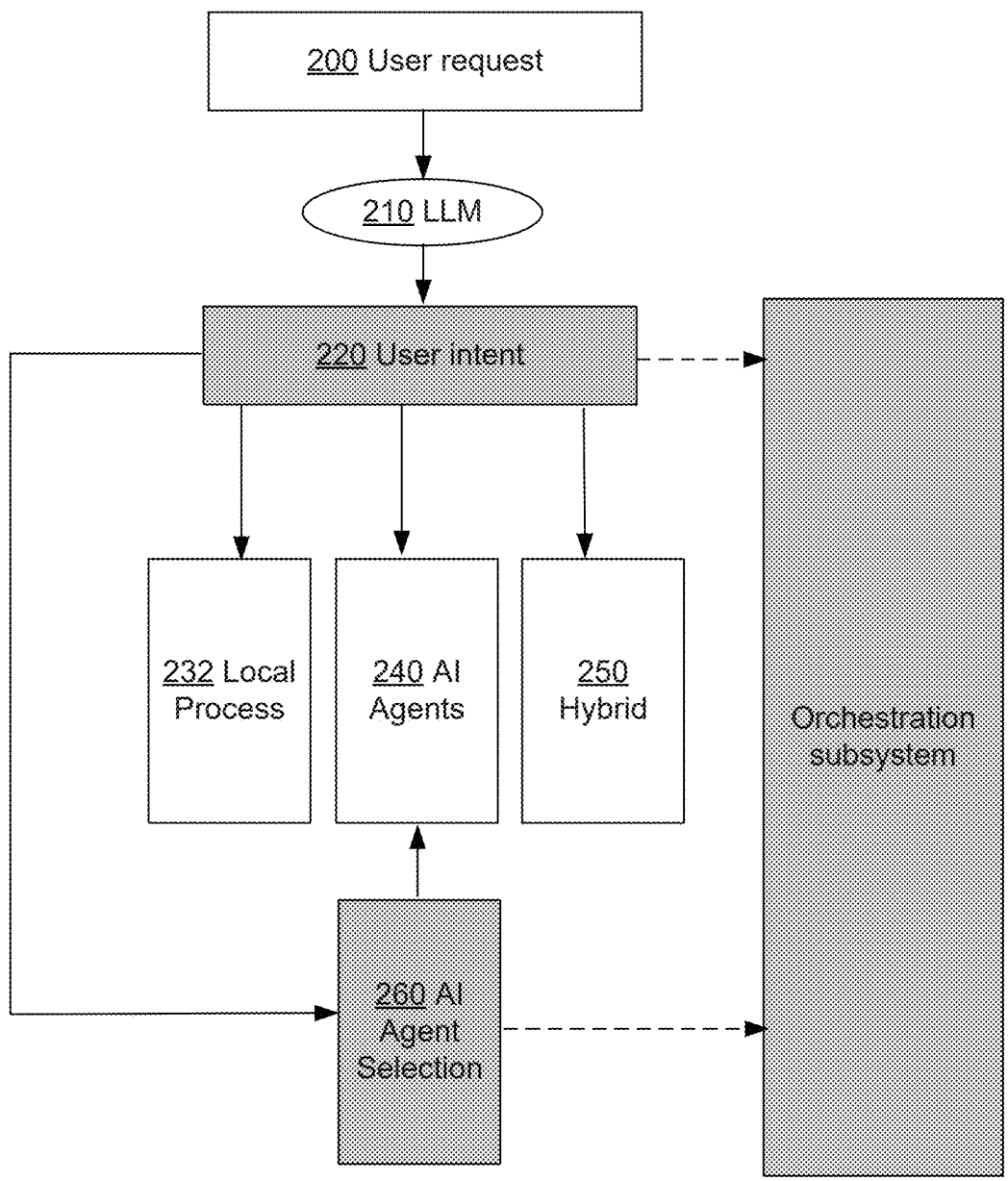
FIG. 2 illustrates an example routing process of a user inquiry in the AI agent orchestration subsystem, in accordance with some embodiments.

To provide a clearer understanding of the functionalities and workflow of the AI agent orchestration subsystem 102, reference is now made to FIG. 2, which depicts an example AI agent orchestration process for handling a user inquiry within the AI agent orchestration subsystem, in accordance with some embodiments.

As shown in FIG. 2, the AI agent orchestration subsystem leverages the user intent LLM 210 to extract and analyze user intent 220 from the user requests 200. The orchestration subsystem first determines whether the user request can be efficiently handled locally 232 using a domain-specific knowledge base (e.g., the RAG 152 in FIG. 1)—such as one containing menus, product information, or code repositories—or whether it requires the invocation of one or more specialized AI agents 240. In some cases, the system may opt for a hybrid approach 250 that combines local processing with AI agent invocation to provide a comprehensive response.

For example, if a user query such as "What is the price of the red dress in size medium?" is received, the AI agent orchestration subsystem identifies that the information required to fulfill the query—product attributes and pricing details—is pre-embedded in the domain-specific knowledge base, such as the relational database within the retrieval-augmented generation (RAG) system. In this scenario, the AI agent orchestration subsystem classifies the query for local handling, generating a structured database query to retrieve the necessary information and construct a natural language response for the user.

In contrast, for a query like "Generate an image of a model wearing a red dress in size medium with accessories," the AI agent orchestration subsystem determines that the task involves complex reasoning and content generation. The orchestration subsystem identifies that AI agent invocation is required, as the task necessitates combining the retrieval of product attributes and images from the knowledge base with the use of a specialized AI agent capable of generating visual content. In this case, the AI agent orchestration subsystem employs a hybrid approach by first querying the local database to extract relevant details about the dress and accessories and then constructing a prompt for the image generation AI agent. The generated image, combined with the retrieved attributes, is synthesized into a cohesive response for delivery to the user.

For a third example, consider a query such as "Summarize the top 10 trending articles about sustainable fashion." The AI agent orchestration subsystem identifies that this query cannot be resolved using local processing alone, as it requires external data aggregation and summarization. It determines that invoking one or more specialized AI agents is necessary. In this case, the AI agent orchestration subsystem selects an AI agent fine-tuned for web scraping and trend analysis to retrieve the relevant articles. This data is then sent to another AI agent specialized in text summarization to generate a concise overview of the trending topics. The final summarized response is returned to the user through the unified interface, showcasing the system's ability to handle complex, multi-step tasks exclusively through AI agent collaboration.

In some embodiments, after identifying AI agent candidates capable of processing the user request, the orchestration subsystem may still employ a context-aware AI model selection process 260 to further refine and optimize the selection. This additional step goes beyond simple capability matching. Even if multiple AI agents can technically handle the user request, the orchestration subsystem analyzes the extracted user intent 220 in conjunction with various real-time model metrics—such as latency, cost, availability, or historical performance—to determine which AI agents are best suited for the task at hand. By leveraging these real-time metrics, the orchestration subsystem ensures that the chosen AI agents not only meet the functional requirements of the request, but also align with the current operational context, ultimately delivering a more efficient, cost-effective, and high-quality user experience.

Figure 3A:
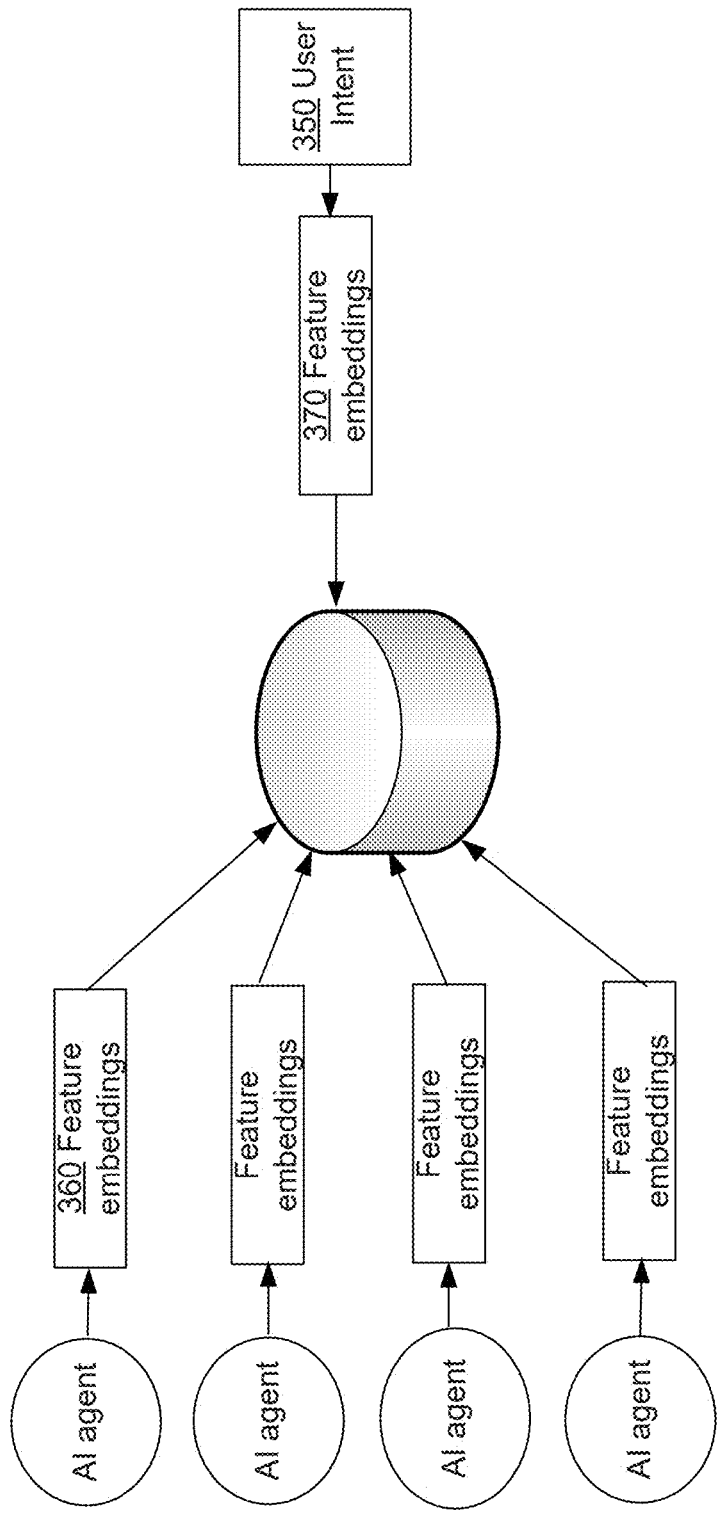
FIG. 3A illustrates an example diagram for selecting AI agent candidates in response to a user inquiry, in accordance with some embodiments.

In a specific use case, the user intent may serve as the initial filter for identifying potential AI agent candidates, mapping the intent to the functional capabilities of the agents (more details in FIG. 3A). On the other hand, real-time model metrics—such as latency, cost, availability, and historical response quality—may be used to further refine the selection (more details in FIG. 3B). These metrics allow the orchestration subsystem to dynamically screen, replace, or augment the list of candidate AI agents, ensuring that the final selection aligns with the task requirements and system constraints. This adaptive decision-making process ensures that user requests are processed efficiently, accurately, and in a resource-optimized manner.

When the AI agents 240 are invoked in response to the user request 200, the AI agent orchestration subsystem is responsible for generating a cohesive and accurate response based on the outputs returned by the AI agents. This process involves evaluating the returned data from the AI agents, selecting the most suitable response when appropriate, or synthesizing a unified response by aggregating multiple outputs.

In scenarios where the orchestration subsystem identifies a single optimal response, it evaluates the returned data using predefined criteria, such as relevance to the user request, confidence scores provided by the AI agents, response latency, and output completeness. For example, if multiple AI agents return responses, the orchestration subsystem assigns an evaluation score to each response based on these criteria. A response with a higher confidence score and closer alignment to the user intent, for instance, would be prioritized over one with a lower confidence score or incomplete information. The system then selects the response with the highest evaluation score as the final output.

Alternatively, in cases where no single response fully addresses the user's inquiry, the orchestration subsystem employs a synthesis process to combine outputs from multiple AI agents. This involves identifying and removing redundant information across the responses, aggregating non-overlapping portions of the data, and synthesizing a unified response. For instance, if one AI agent provides a detailed textual description while another returns numerical data or visual elements, the system integrates these complementary outputs into a single, coherent response.

To achieve semantic and grammatical coherence in the unified response, the orchestration subsystem may leverage the user intent LLM. The LLM processes the aggregated outputs, ensuring that the synthesized response is fluently phrased and contextually appropriate for delivery to the user.

In some embodiments, when the AI agent orchestration subsystem 102 identifies a target AI agent for handling a user request, the orchestration subsystem determines whether the target AI agent is in an active state or an inactive state. This determination is based on system telemetry data indicating the operational status of AI agent instances, including memory allocation, processor usage, and network connectivity.

If the identified target AI agent is in an inactive state, the orchestration subsystem 102 initiates a spin-up process to instantiate an execution environment for the AI agent. The spin-up process includes provisioning the required processor cycles, memory, and network bandwidth using a cloud-based resource manager that dynamically allocates resources based on system demand. Once resources are provisioned, the orchestration subsystem instantiates a containerized execution environment or a virtual machine instance to host the AI agent. The pre-trained AI model corresponding to the target AI agent is then loaded into the instantiated execution environment, ensuring that the agent is fully operational and capable of responding to queries.

Here, the containerized execution environment refers to an isolated runtime environment that encapsulates the target AI agent along with its required software dependencies, execution binaries, and libraries within a lightweight, portable instance. The containerized execution environment operates under an orchestration framework that enables on-demand instantiation, scaling, and deallocation based on system workload. The orchestration subsystem 102 provisions processor cycles, memory, and network resources to the containerized execution environment, ensuring that the AI agent is executed with minimal resource overhead while allowing rapid deployment and termination when no longer needed.

The virtual machine instance refers to a fully virtualized execution environment that provides the target AI agent with an independent operating system instance, kernel-level isolation, and dedicated resource allocation, including processor cores, memory, and networking interfaces. Unlike the containerized execution environment, the virtual machine instance operates under a hypervisor-based virtualization layer, allowing the AI agent to execute within a persistent state and utilize specialized hardware acceleration, such as dedicated graphics processing resources, for compute-intensive tasks. The virtual machine instance is instantiated with a pre-configured execution framework that ensures compatibility with the AI agent's inference operations.

During initialization, the orchestration subsystem 102 monitors the AI agent's readiness using system telemetry data. The telemetry data includes indicators such as container health status, service availability, and real-time logging of system responses. Once the AI agent reaches a ready state, meaning it can accept and process user requests, the orchestration subsystem routes the pending request to the AI agent and sends one or more prompts corresponding to the user request.

If the identified target AI agent is already in an active state, the orchestration subsystem bypasses the spin-up process and directly routes the request to the agent for processing. The system ensures that request processing remains seamless by dynamically managing AI agent availability based on real-time demand and workload distribution.

Real-Time Model Metrics

As mentioned above, the real-time model metrics of the AI agents may be used for selecting the most suitable AI agents to process a user request. For instance, two fundamental metrics, latency and cost per query, directly influence how quickly a user request is answered and at what expense. Low-latency models ensure rapid responses, ideal for time-sensitive interactions, while cost per query allows the system to choose agents that balance computational expenses with performance. When combined, these metrics enable the orchestration subsystem to dynamically select AI agents that best fit the task's requirements and operational constraints, improving both user satisfaction and resource efficiency.

In addition to latency and cost, the system can leverage confidence scores to guide selection. If AI models provide a measure of how certain they are in their predictions, the orchestration subsystem can favor agents with higher confidence, thus enhancing accuracy and reliability. This is particularly helpful in complex or ambiguous queries where selecting the most confident model reduces the likelihood of errors or irrelevant answers.

The orchestration subsystem may also continuously monitor availability and uptime for each AI agent, integrating signals from health-check APIs, monitoring tools, and webhook notifications. If a model becomes unavailable due to maintenance, overload, or a sudden outage, the orchestration subsystem automatically excludes it and reroutes requests to alternative agents. This proactive management maintains seamless operation, preventing slowdowns and ensuring uninterrupted user experiences.

Throughput is another key metric, reflecting how many queries a model can handle within a given time frame. When an AI agent nears its capacity, the orchestration subsystem may redirect traffic to less burdened agents to prevent degradation in response quality or speed. This dynamic load balancing, guided by real-time throughput data, ensures that models are neither overworked nor underutilized.

As new model versions emerge, performance enhancements may make older models less optimal. By tracking versioning and preferring newer, more capable models, the orchestration subsystem ensures that users consistently benefit from the latest advancements. Over time, this feedback loop of monitoring and selecting agents based on latency, cost, accuracy, confidence, availability, and throughput-supplemented by smart versioning choices-enables the system to adapt fluidly to changing conditions, user demands, and market dynamics.

Obtaining the real-time model metrics may involve integrating the orchestration subsystem with monitoring and telemetry frameworks that track various performance indicators. For instance, to measure latency, the orchestration subsystem can wrap each AI model invocation in a timer mechanism. Before sending a request to the model's endpoint, the orchestration subsystem captures a timestamp. Once the response returns, it records another timestamp, and the latency is calculated by taking the difference. Over time, the orchestration subsystem can maintain a rolling average or an exponential moving average (EMA) of these latency measurements to account for transient fluctuations. Such measurements are recorded in real-time and stored in a centralized database, allowing the orchestration subsystem to dynamically adjust its model selection strategy based on recent latency trends.

For cost per query, the system may integrate directly with billing or resource management APIs provided by the cloud platform hosting the AI models. Each time the orchestration subsystem sends a request to a model, it queries the platform's billing endpoint or cost-tracking service. The returned data might detail how many computational resources (e.g., GPU seconds or vCPU minutes) were consumed, translating directly into a per-request cost. By caching these results and periodically refreshing them, the orchestration subsystem maintains an up-to-date understanding of each model's cost profile. In some other embodiments, the system may crawl websites or social media associated with the base models, obtaining the real-time information of the cost per query.

To assess availability and uptime, the orchestration subsystem may periodically send health-check requests ("ping" messages) to the model's health-check endpoint. If the model responds within a predefined latency threshold with a status code indicating success, it is marked as available. Otherwise, it's flagged as temporarily unavailable. Additionally, the orchestration subsystem may subscribe to webhook notifications that the hosting platform publishes whenever a model's status changes—such as when maintenance is scheduled or a model instance scales down due to low usage.

Throughput data is often obtained through integration with infrastructure monitoring tools. For example, if the models are hosted on AWS SageMaker, the orchestration subsystem might use AWS CloudWatch metrics. By querying CloudWatch at regular intervals, the orchestration subsystem retrieves metrics like the number of requests served per second or the current active request count.

For confidence scores, the models themselves must return a confidence measure alongside their primary output. The orchestration subsystem collects this data directly from the model's response payload. For example, if a text classification model provides a JSON response that includes "confidence": 0.92, the orchestration subsystem extracts this value, logs it, and uses it to rank candidate models for similar tasks. Over time, these confidence scores can be aggregated and analyzed, further refining the orchestration subsystem's decision-making by correlating confidence levels with historical accuracy and user satisfaction metrics.

By combining these data retrieval techniques—instrumented timers for latency, billing APIs for cost, health-check endpoints for availability, infrastructure monitoring tools for throughput, and model response payloads for confidence—the orchestration subsystem continuously gathers a rich set of real-time metrics.

In some embodiments, the AI agent orchestration subsystem 102 continuously monitors real-time model metrics to assess the performance of active AI agents. These real-time metrics include response latency, throughput capacity, confidence scores, error rates, and system load. If an active AI agent exhibits a degrading trend in one or more of these metrics—such as increasing response latency approaching its throughput limit—the orchestration subsystem 102 preemptively spins up an additional instance of the AI agent in anticipation of heavier traffic or insufficient capacity in the existing instance. For example, if response latency consistently increases while approaching a throughput limit, or if error rates and request timeouts exceed a predefined threshold, the orchestration subsystem anticipates an impending service bottleneck. To mitigate such degradation before it impacts system performance, the orchestration subsystem preemptively spins up an additional instance of the AI agent in anticipation of heavier traffic or insufficient capacity in the existing instance.

When preemptive scaling is triggered, the orchestration subsystem dynamically provisions additional processor cycles, memory, and network bandwidth for a new AI agent instance using a cloud-based resource manager. In some embodiments, instead of relying on predefined thresholds, the orchestration subsystem 102 may apply a gradient-based resource allocation mechanism that dynamically adjusts the provisioning rate based on real-time workload fluctuations and expected computational demand. Once resources are provisioned, the orchestration subsystem 102 instantiates a new containerized execution environment or virtual machine instance associated with the additional AI agent, ensuring that the new instance inherits pre-configured runtime dependencies, execution policies, and security constraints from the existing agent instances. The orchestration subsystem then loads the corresponding pre-trained model into the execution environment, optimizing inference performance through warm-start initialization, where frequently accessed model weights and runtime parameters are preloaded into memory to reduce cold-start latency. By spinning up new AI agent instances in advance of significant performance degradation, the orchestration subsystem ensures that response times remain within an optimal range, preventing service delays and maintaining overall system efficiency under increasing load conditions.

Upon successful instantiation of the additional AI agent instance, the orchestration subsystem 102 automatically distributes the incoming requests among all active instances of the AI agent. This is achieved through a dynamic load-balancing mechanism that monitors real-time performance metrics and dynamically routes requests based on system load, response latency, and processing efficiency. The system may modify network routing tables, update API gateway configurations, or adjust connection weights to optimize request distribution among AI agent instances.

In some embodiments, the AI agent orchestration subsystem 102 not only provisions additional instances of AI agents in response to performance degradation but also deactivates certain AI agent instances when performance metrics indicate that they are no longer required. This dynamic instance deactivation mechanism operates as an automated resource reclamation process, similar to garbage collection, ensuring that system resources are efficiently managed in a cloud computing environment.

For example, the orchestration subsystem 102 continuously monitors real-time model metrics, including request volume, response latency, CPU and memory utilization, and agent-specific performance indicators. If an AI agent instance experiences a sustained period of underutilization, such as low request volume over a defined threshold duration, the orchestration subsystem determines whether deactivation is warranted. Additionally, if an AI agent's resource consumption exceeds efficiency thresholds relative to the number of processed requests, the system prioritizes deactivation to free up computational resources for more active agents.

When deactivation criteria are met, the orchestration subsystem 102 may gradually reduce the allocation of processor cycles, memory, and network bandwidth for the AI agent instance, allowing it to complete any pending tasks before full deactivation. The orchestration subsystem 102 may offload ongoing tasks to other active AI agent instances to ensure continuity in request handling. Once all queued tasks are processed, the orchestration subsystem terminates the AI agent instance by releasing allocated cloud resources, shutting down the corresponding containerized execution environment or virtual machine instance, and updating the system state to reflect the instance's deactivation. This way, the orchestration subsystem minimizes cloud computing costs, optimizes resource allocation, and enhances overall system efficiency without compromising service availability.

Proactive Action Module

Referring back to FIG. 1 to describe additional components within the multi-agent system 100, one of the key advancements over existing AI-powered client-facing agents is the ability to address the technical limitation of passivity. Traditional AI agents primarily function in a reactive mode, responding to user queries or comments. While some agents may include follow-up questions to extend conversations, the interaction is still fundamentally user-initiated and thus constrained by a passive operational framework.

The multi-agent system 100 overcomes this limitation by incorporating a proactive action module 130 that enables AI agents to interact with end users in a forward-thinking and anticipatory manner. This module 130 leverages the collaborative functionality of multiple specialized AI agents within the system to deliver a deeply contextualized and personalized user experience. By understanding user language, preferences, commands, and historical interactions, the proactive action module 130 enables the AI agents to initiate interactions, perform tasks, and offer services without requiring explicit user prompts.

For instance, AI agents within the system may use proactive insights to remind users of upcoming events, such as anniversaries, or recommend timely actions, like ordering pizza for an anticipated Super Bowl party. These proactive engagements are driven by a combination of business rules, user behavior patterns, and external event triggers.

The proactive action module 130 may include several components to facilitate its functionality. A scheduler 132 and a timer coordinate the generation of silent prompts 138, which are tailored to individual users. These silent prompts 138 are created based on triggering events 134, such as significant personal milestones or relevant business events, and are dynamically aligned with user-specific data stored in the system's relational database 146. For instance, the module can access a user's digital calendar 136 to monitor upcoming events and dynamically generate silent prompts 138 that anticipate user needs.

The scheduler 132 continuously evaluates user-specific information within the relational database 146 to identify opportune moments for engagement. By observing contextual signals and integrating them with preconfigured marketing events or business rules, the proactive action module 130 empowers AI agents to initiate interactions that align with the user's preferences and goals. This proactive communication strategy fundamentally differentiates the multi-agent system 100 from traditional reactive systems, enabling AI agents to anticipate and address user needs before explicit inquiries are made.

FIG. 3A illustrates an example diagram for selecting AI agent candidates in response to a user inquiry, in accordance with some embodiments. The diagram represents the workflow of the AI agent orchestration subsystem, focusing on identifying suitable AI agent candidates from a pool of fine-tuned AI agents based on the extracted user intent. This process leverages natural language processing (NLP), vector-based similarity matching, and dynamic ranking mechanisms to ensure the most appropriate agents are selected.

In some embodiments, the user inquiry is first processed by the user intent LLM through a series of automated, computer-implemented steps. The LLM begins by tokenizing the raw text input into units such as words, subwords, or characters, a process carried out by a specialized tokenization module executing on a server or cloud instance. Each token is then converted into a high-dimensional vector embedding by querying a learned embedding matrix stored in memory. These embeddings are fed into a neural network, often a transformer-based model running on GPUs or specialized accelerators, where multiple attention layers compute intricate relationships between tokens to capture contextual nuances of the query.

During this process, part-of-speech tagging is performed by passing the token embeddings through sequence labeling layers, while named entity recognition is accomplished by mapping the embeddings to entity labels using an attention-based classification head. Semantic analysis, such as identifying the underlying intent behind the user's words, involves applying dense prediction layers that aggregate attention outputs and produce probability distributions over predefined intent categories. For example, a query like "What is the price of a red dress?" might yield a high probability for the "Product Price Retrieval" category.

As user behavior evolves, the system periodically retrains and fine-tunes the LLM on updated domain-specific datasets. This involves automatically ingesting new training samples, augmenting them to increase coverage, and running iterative optimization steps such as stochastic gradient descent on large distributed training clusters. Performance metrics, stored in a model registry, guide the automatic selection of model checkpoints that exhibit improved accuracy. In this way, the model continuously refines its parameters-without human intervention-ensuring that it adapts to emerging linguistic patterns, product lines, or seasonal trends, ultimately delivering precise intent classification results at scale.

Once the user intent 350 is determined, it is converted into a vectorized representation or feature embedding 370 that encodes the semantic meaning of the query. The system uses the same embedding model or LLM that processed the user request to ensure consistency. Simultaneously, each AI agent in the pool is characterized by a detailed functional description-such as "image generation," "text summarization," "price retrieval," or "attribute classification"-along with metadata like supported input/output formats, domain specialization, and confidence thresholds. These descriptions are similarly transformed into vectorized representations or feature embeddings 360. For instance, an agent capable of generating images from textual prompts would have an embedding emphasizing visual creation capabilities, while another specialized in product database queries would have an embedding reflecting its aptitude for retrieving structured attribute and pricing data.

With both the user intent vector and the agent description vectors in a comparable embedding space, the system performs a vector-based similarity search. Metrics like cosine similarity measure how closely an agent's capabilities align with the semantic meaning of the user intent. Agents whose similarity scores exceed a predefined threshold are identified as candidate AI agents. For example, for a "Product Price Retrieval" intent, agents trained to handle product-related queries and database interactions might rank highly. Conversely, an intent classified as "Image Generation Task" would surface agents proficient in producing visual content. This step ensures that only agents semantically relevant to the user's request are shortlisted.

After identifying candidate AI agents through semantic similarity, the system may apply functional filters to further refine the selection. These filters validate whether the shortlisted agents meet the task-specific requirements, such as supporting the necessary input/output formats or being specialized in the appropriate domain. For instance, if the user request involves generating an image, the candidate agent must explicitly support image output. Agents that do not meet these criteria are excluded at this stage. Once the final set of candidate AI agents is determined, they are ranked based on their similarity scores and the outcomes of the functional filtering. If multiple agents achieve comparable scores, additional criteria—such as historical performance, latency, cost per query, or accuracy—may be considered to break ties and select the top-ranking agents for invocation.

To maintain adaptability and continuous improvement, the system incorporates a feedback loop. The outcomes of interactions with selected agents are logged and analyzed, capturing metrics like user satisfaction, task completion rates, and error occurrences. These insights guide updates to the intent-to-agent mapping and the agent embeddings. For example, if a new AI agent is introduced to handle a specialized domain, or if existing agents undergo performance improvements, the system's dynamic mapping table is refreshed to ensure the orchestration subsystem always has an accurate and up-to-date view of each agent's capabilities. Similarly, outdated or underperforming agents can be deprioritized or replaced, ensuring that the system remains responsive to changing conditions and user needs.

Figure 3B:
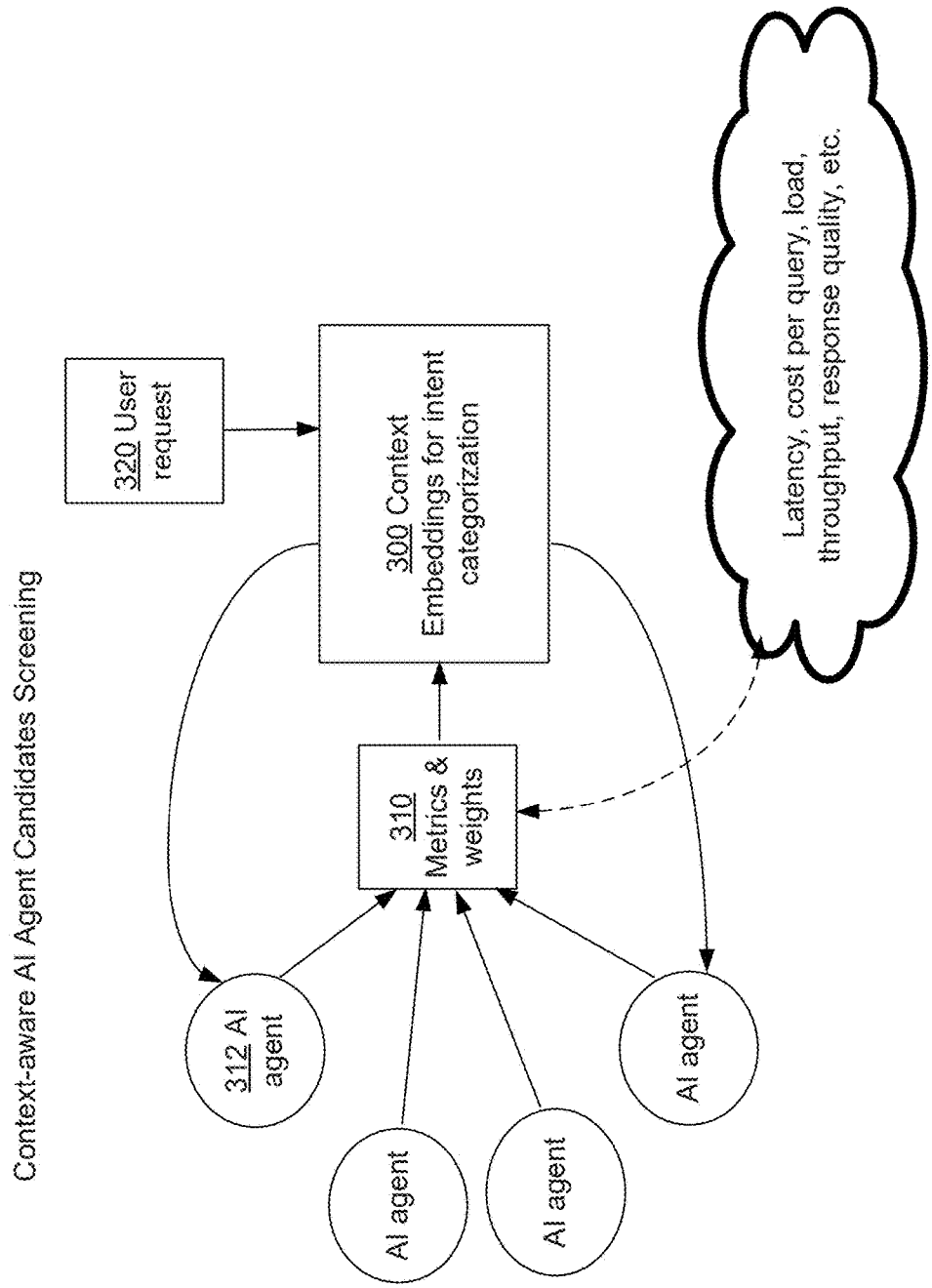
FIG. 3B illustrates an example diagram of screening the AI agent candidates in a context-aware manner, in accordance with some embodiments.

FIG. 3B illustrates an example diagram of screening the AI agent candidates in a context-aware manner, in accordance with some embodiments. This process further screen and adjust the AI agent candidates selected using the process described in FIG. 3A, based on task-specific requirements and system-level constraints.

Once the candidate AI agents 312 are identified, the orchestration subsystem evaluates their suitability using a combination of the extracted user intent, real-time model metrics, and task-specific context.

In some embodiments, the first step involves categorizing the user request 320 into a context category, which provides insight into the urgency, complexity, and intent of the task. The user request is encoded into context embeddings and classified into intent categories 300 using a machine learning-based intent classification model, which extracts and embeds features such as textual content, input modality (e.g., text, image, or audio), temporal patterns (e.g., real-time vs. delayed response requirements), and user interaction history. Additionally, semantic and contextual embeddings are extracted from the request using the user intent LLM to identify latent attributes that may influence the categorization.

The context categorization 300 serves as a guiding framework for dynamically scaling real-time model metrics based on the system's automated evaluation of user interactions and request characteristics. To determine whether a given user request requires immediate responsiveness, the system applies a computer-implemented classification process that analyzes both recent interaction patterns and the current query's inferred intent. For example, if the user has been continuously sending messages within short intervals and the intent classification model detects no contextual cues indicating that a delayed response would be acceptable (e.g., no scheduling tasks, no long-term planning queries), the system automatically flags this scenario as a real-time interaction context.

This classification may involve executing time-based filters, threshold checks on user inactivity periods (e.g., low delay on the user's side indicates active chatting, demanding low-latency response), and semantic parsing of the user's language for urgency indicators. If these computational criteria are met, the system programmatically adjusts the weighting of metrics such as latency within the agent selection algorithm. Specifically, it increases the coefficient for response time in the scoring function, thereby prioritizing AI agents capable of delivering rapid responses over those that may be more cost-efficient or marginally more accurate but slower. By automating this determination process through strict computational logic and input-driven criteria, the system ensures that agents aligned with real-time requirements are consistently selected, maintaining user engagement and satisfaction in high-intensity, conversational scenarios.

Conversely, when the system's classification process determines that the user request falls into a delayed or asynchronous context—such as when the user query references future deadlines, long-term planning, or non-urgent actions—accuracy becomes the dominant metric. To identify these scenarios, the system analyzes temporal cues embedded in the query (e.g., phrases like "next week," "later," or "when convenient") and consults user interaction logs to confirm that an immediate response is not critical. For instance, if the average response interval for the user's past requests is relatively long or the query includes explicit scheduling references, the system programmatically categorizes the request as asynchronous.

Once the asynchronous nature of the request is established, the model orchestration subsystem dynamically adjusts its weighting mechanism. It applies a higher coefficient to the accuracy metric in the agent scoring function, ensuring that the selected AI agents produce reliable and contextually correct outputs. Cost per query may be assigned a moderate or secondary priority, allowing the system to choose more economical agents if multiple candidates achieve similar accuracy levels. The latency metric, in this scenario, receives the lowest weight, as the system deduces that a slightly longer turnaround time is acceptable.

For requests categorized as refinement tasks—where the user specifically seeks to improve or correct a previously generated result—the system applies a computer-implemented logic that prioritizes accuracy above all other metrics. This categorization may be determined by analyzing the user's current and past inquiries, identifying that the user is referring to an existing output rather than requesting entirely new information. For example, the system may detect revision-oriented language or explicit references to prior results (e.g., "Revise," "Improve," "Fix the previous summary") within the user query.

Upon confirming that the request is a refinement task, the orchestration subsystem automatically adjusts the agent selection algorithm to elevate the weight assigned to the accuracy metric. In practice, this means increasing the accuracy coefficient in the scoring function used to rank candidate AI agents, ensuring that the final choice yields the most contextually aligned and reliable output. Latency and cost-efficiency factors are correspondingly deprioritized. The system may, for instance, reduce their influence to near-zero in the weighted calculations, as even a slightly slower or more expensive solution is acceptable if it guarantees a more precise and contextually nuanced refinement.

After the system determines the context category, it executes a computer-implemented metric scaling procedure that adjusts the relative importance of each performance metric. This adjustment may involve referencing a configuration file, a model registry, or a dynamic rules engine that associates each context category (e.g., real-time, delayed/asynchronous, refinement) with predefined weighting factors. The orchestration subsystem then applies these weighted factors to the candidate AI agents identified during the initial intent-matching phase.

Once the metrics have been scaled, the subsystem calculates a composite score for each candidate agent. This composite score may be derived by summing the products of each metric's value and its corresponding weight, or by applying more complex functions like weighted harmonic means. Agents that fail to meet a minimum composite score threshold—defined to ensure overall quality—are automatically filtered out. For example, in a real-time interaction context, any agent whose latency metric, once weighted, drags its composite score below the threshold is excluded, regardless of its accuracy level. In a refinement task, however, the same agent might remain a strong contender if its high accuracy offset any disadvantages in latency or cost-efficiency.

After filtering, the system ranks the remaining agents according to their composite scores. The top-scoring agents are selected as the target AI agents for invocation, ensuring that the system's choice of agent reflects not only the user's intent but also the contextual requirements encoded in the scaling rules.

As shown during the AI model screening process, the machine learning-based intent classification model plays a central role in dynamically mapping user requests to predefined context categories. This enables the system to flexibly adapt its decision-making logic according to the nature of each task. The model's development begins with the creation of a labeled dataset, where each user request is paired with a specific context category—such as "real-time interaction," "delayed task," or "refinement task." Constructing this dataset involves automated data ingestion pipelines that collect user interaction logs, system request histories, and meta-information (e.g., timestamps, input modalities), ensuring the dataset accurately reflects real-world conditions.

To maintain data quality, the dataset undergoes a computer-implemented preprocessing pipeline. Textual input is tokenized, normalized, and stripped of inconsistencies by string manipulation libraries and language processing modules. Simultaneously, specialized routines handle multi-modal inputs. For example, audio recordings are automatically transcribed using ASR models, and images are passed through computer vision algorithms—like OCR or object detection models running on GPUs—to extract textual or visual features. All these operations are executed algorithmically and can be distributed across multiple servers or cloud instances for scalability.

Once the raw data is cleansed and standardized, feature extraction modules transform it into machine-readable representations. The user intent LLM generates semantic and contextual embeddings for the textual data, encoding subtle contextual cues and latent user intents as high-dimensional vectors. Domain-specific models perform analogous transformations on non-textual inputs, such as leveraging CNN-based feature extractors for image data or transformer-based encoders for speech representations. These embeddings are then combined with additional features—like input modality and temporal metadata—to produce a comprehensive feature vector capturing all relevant dimensions of the user request.

The intent classification model may be trained using supervised learning and use neural network architectures like transformers, recurrent neural networks (RNNs), or dense feed-forward networks. As the model trains, it executes gradient-based optimization routines on large-scale compute clusters, repeatedly refining its internal parameters to minimize a cross-entropy loss function. Each forward pass through the model's layers—attention blocks, convolutional filters, or recurrent cells—identifies patterns and relationships within the data. A softmax output layer converts the final latent representation into a probability distribution over the predefined categories, enabling precise classification of each user request's context.

To ensure robustness and generalization, the training process incorporates techniques like dropout, L2 regularization, and early stopping, all managed by automated schedulers without human intervention. The system regularly evaluates the model's performance on a validation dataset, computing accuracy, precision, recall, and F1 score. If performance lags behind predefined thresholds, hyperparameter tuning routines or architecture search algorithms are triggered automatically. These computational strategies guarantee that the final model operates reliably under diverse conditions.

Once the model attains satisfactory performance metrics, it is deployed as a runtime service within the production environment. For each incoming user request, the system programmatically generates a feature vector through the established pipelines, feeds it into the intent classification model, and obtains a context category prediction in real-time. For example, a request like "Schedule a team meeting for next week" might be categorized as a "delayed task," while "What is the status of my order?" could be classified as a "real-time interaction." These predictions are directly integrated into the model orchestration subsystem's logic, guiding the automated scaling of metrics like latency, cost-efficiency, or accuracy to optimally select target AI agents—all without requiring manual oversight.

Figure 4:
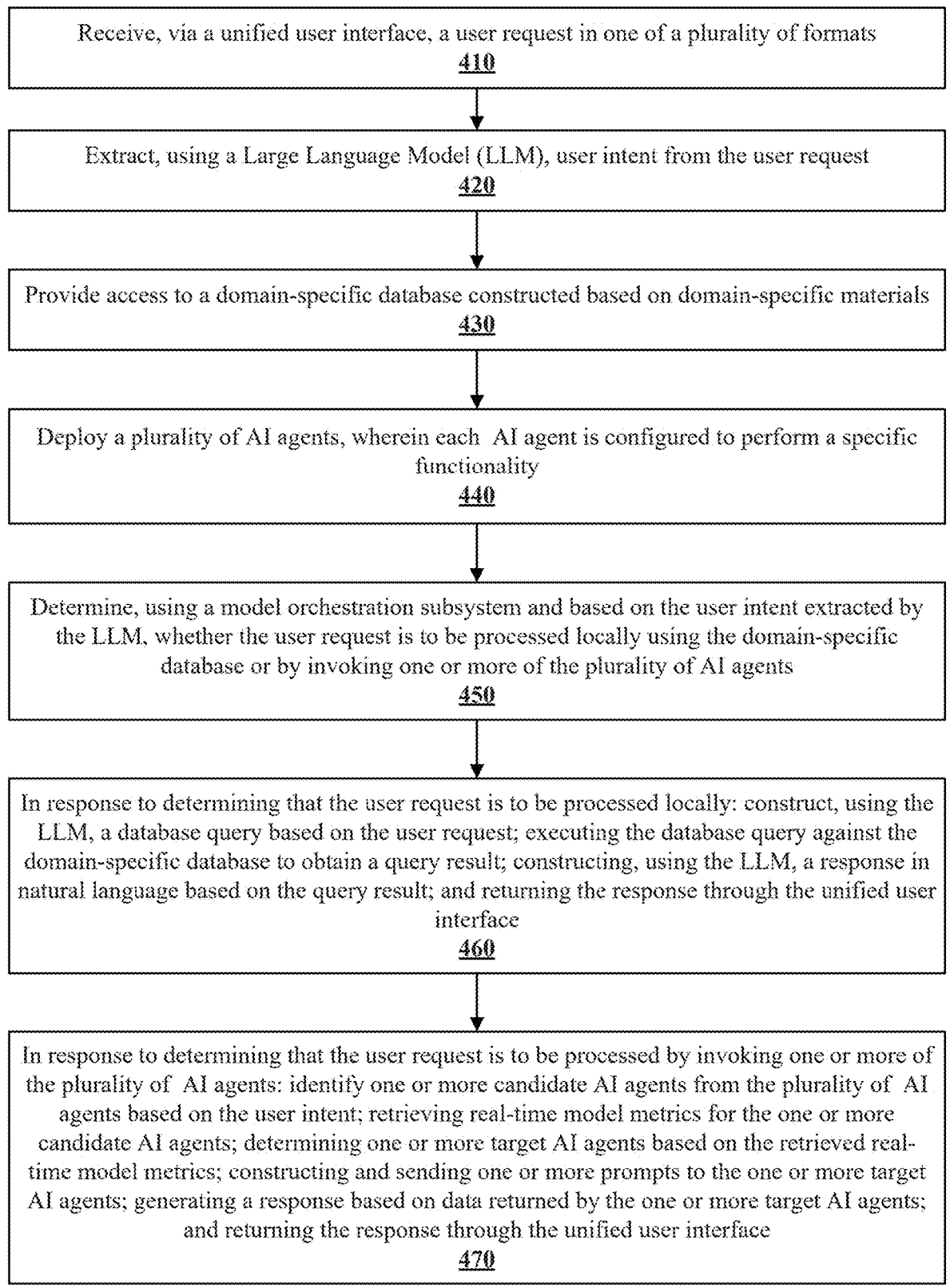
FIG. 4 illustrates an example process implemented by the AI agent orchestration subsystem, in accordance with some embodiments.

FIG. 4 illustrates an example process implemented by the AI agent orchestration subsystem, in accordance with some embodiments. In some implementations, one or more process blocks of FIG. 4 may be performed by a device.

As shown in FIG. 4, process 400 may include receiving, via a unified user interface, a user request in one of a plurality of formats (block 410). For example, the device may receive, via a unified user interface, a user request in one of a plurality of formats, as described above.

As also shown in FIG. 4, process 400 may include extracting, using a Large Language Model (LLM), user intent from the user request (block 420). For example, the device may extract, using a large language model (LLM), user intent from the user request, as described above.

As further shown in FIG. 4, process 400 may include providing access to a domain-specific database constructed based on domain-specific materials (block 430). For example, the device may provide access to a domain-specific database constructed based on domain-specific materials, as described above.

As also shown in FIG. 4, process 400 may include deploying a plurality of fine-tuned AI agents, where each fine-tuned AI agent is configured to perform a specific functionality (block 440). For example, the device may deploy a plurality of fine-tuned ai agents, where each fine-tuned ai agent is configured to perform a specific functionality, as described above.

As further shown in FIG. 4, process 400 may include determining, using a model orchestration subsystem and based on the user intent extracted by the LLM, whether the user request is to be processed locally using the domain-specific database or by invoking one or more of the plurality of fine-tuned AI agents (block 450). For example, the device may determine, using a model orchestration subsystem and based on the user intent extracted by the LLM, whether the user request is to be processed locally using the domain-specific database or by invoking one or more of the plurality of fine-tuned ai agents, as described above.

As also shown in FIG. 4, process 400 may include in response to determining that the user request is to be processed locally: constructing, using the LLM, a database query based on the user request; executing the database query against the domain-specific database to obtain a query result; constructing, using the LLM, a response in natural language based on the query result; and returning the response through the unified user interface (block 460). For example, the device may in response to determining that the user request is to be processed locally: construct, using the LLM, a database query based on the user request; executing the database query against the domain-specific database to obtain a query result; constructing, using the LLM, a response in natural language based on the query result; and returning the response through the unified user interface, as described above.

As further shown in FIG. 4, process 400 may include in response to determining that the user request is to be processed by invoking one or more of the plurality of fine-tuned AI agents: identifying one or more candidate AI agents from the plurality of fine-tuned AI agents based on the user intent; retrieving real-time model metrics for the one or more candidate AI agents; determining one or more target AI agents based on the retrieved real-time model metrics; constructing and sending one or more prompts to the one or more target AI agents; generating a response based on data returned by the one or more target AI agents; and returning the response through the unified user interface (block 470). For example, the device may in response to determining that the user request is to be processed by invoking one or more of the plurality of fine-tuned ai agents: identify one or more candidate ai agents from the plurality of fine-tuned ai agents based on the user intent; retrieving real-time model metrics for the one or more candidate ai agents; determining one or more target ai agents based on the retrieved real-time model metrics; constructing and sending one or more prompts to the one or more target ai agents; generating a response based on data returned by the one or more target ai agents; and returning the response through the unified user interface, as described above.

Process 400 may include additional implementations, such as any single implementation or any combination of implementations described below and/or in connection with one or more other processes described elsewhere herein. In a first implementation, the plurality of fine-tuned AI agents may include: a plurality of AI agents trained to perform a same functionality using different base models; a plurality of AI agents trained to process data in the plurality of formats, having text, voice, and image; and a plurality of AI agents trained to handle different aspects of the user request.

A second implementation, alone or in combination with the first implementation, process 400 may include training the LLM to extract user intent from the user request, where the training may include: receiving a dataset having a plurality of user queries and corresponding ground truth intent labels, where the dataset represents a diverse range of user intentions and query formats relevant to a target domain; preprocessing the dataset to normalize query formats, tokenize textual data, or remove inconsistency, thereby generating a standardized dataset for training; and fine-tuning a pre-trained LLM using the standardized dataset by optimizing model parameters of the pre-trained LLM to minimize a loss function representing a difference between predicted intent labels and corresponding ground truth intent labels, and adapt the pre-trained LLM to nuances of domain-specific intent extraction tasks.

In a third implementation, alone or in combination with the first and second implementation, the real-time model metrics of the one or more candidate AI agents may include one or more of the following: real-time latency, representing a response time of each candidate AI agent for processing a request; cost per query, representing a computational or monetary cost associated with invoking each candidate AI agent; availability status, representing an operational uptime or current load condition of each candidate AI agent; throughput, indicating a number of queries each candidate AI agent processes per unit time; and historical response quality, based on previously observed performance metrics, such as user feedback, error rates, or relevance of responses.

In a fourth implementation, alone or in combination with one or more of the first through third implementations, the identifying one or more candidate AI agents from the plurality of fine-tuned AI agents based on the user intent may include: generating a vectorized representation of the user intent to encode semantic meaning; retrieving vectorized representations of functional descriptions associated with each of the plurality of fine-tuned AI agents, where the functional descriptions include tasks supported by each AI agent; performing a vector-based similarity search based on the vectorized representation of the user intent and the vectorized representations of the functional descriptions to obtain similarity scores for the plurality of fine-tuned AI agents; and identifying AI agents having the similarity scores exceeding a predefined threshold as the candidate AI agents, where the candidate AI agents are ranked based on the similarity scores.

In a fifth implementation, alone or in combination with one or more of the first through fourth implementations, the determining one or more target AI agents based on the corresponding real-time model metrics may include: categorizing, using the LLM, the user request into one of plurality of context categories, each context category being indicative of at least one of user intent, task urgency, or task complexity; adjusting weights of the real-time model metrics based on the context category of the user request, such that one or more of the real-time model metrics are dynamically prioritized; and selecting the one or more target AI agents based on the weighted real-time model metrics.

In a sixth implementation, alone or in combination with one or more of the first through fifth implementations: in response to that the context category of the user request indicates a real-time interaction requiring immediate responses, a latency metric is prioritized over a cost-efficiency metric and an accuracy metric; in response to that the context category of the user request indicates a delayed or asynchronous task, the cost-efficiency metric is prioritized over the latency metric, while maintaining a minimum accuracy threshold of the accuracy metric; and in response to that the context category of the user request indicates a refinement task or user correction of a previously generated result, the accuracy metric is prioritized over the latency metric and the cost-efficiency metric.

In a seventh implementation, alone or in combination with one or more of the first through sixth implementations, the categorizing the user request into one of plurality of context categories may include: analyzing, using a machine learning-based intent classification model, one or more features of the user request, the features having textual content, input modality, temporal patterns, or user interaction history; extracting, using the LLM, semantic and contextual embeddings from the user request to identify latent task-specific attributes; training a context classification model based on a dataset having labeled user requests associated with corresponding context categories; predicting, using the trained context classification model, a context category for the user request based on the analyzed features and extracted embeddings; and providing the predicted context category as input to the model orchestration subsystem for scaling the real-time model metrics.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
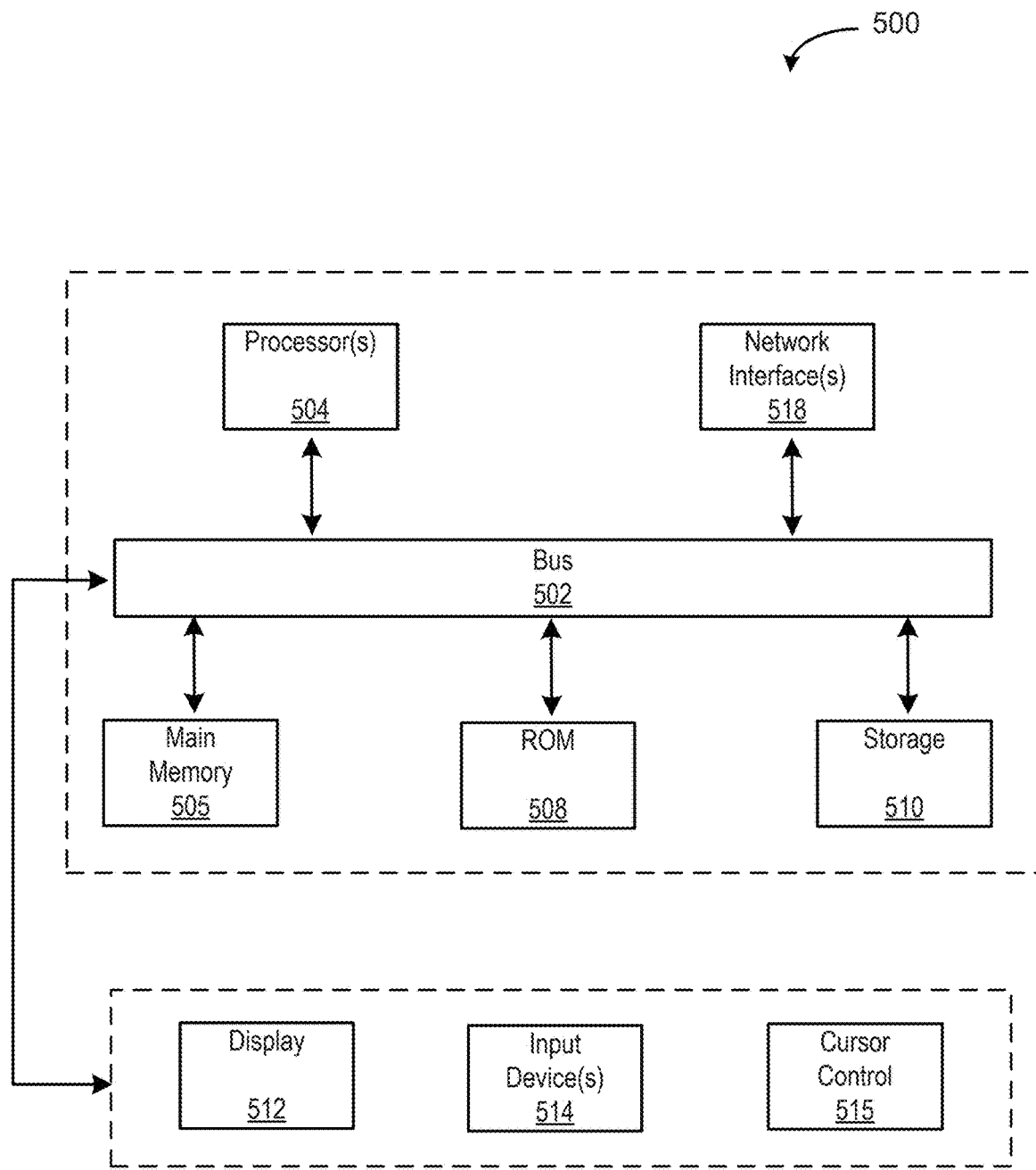
FIG. 5 illustrates an example computing device in which any of the embodiments described herein may be implemented.

FIG. 5 illustrates a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 505, such as a random-access memory (RAM), cache and/or other dynamic storage devices, coupled to bus 502 for storing information and instructions to be executed by processor 504. Main memory 505 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 515, including alphanumeric and other keys, is coupled to bus 502 for communicating information and command selections to processor 504. Another type of user input device is cursor control 515, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device function described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 505. Such instructions may be read into main memory 505 from another storage medium, such as storage device 510. Execution of the sequences of instructions contained in main memory 505 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 405. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 505 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 505, from which processor 505 retrieves and executes the instructions. The instructions received by main memory 505 may retrieves and executes the instructions. The instructions received by main memory 505 may optionally be stored on storage device 510 either before or after execution by processor 505.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 505 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the function involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and function presented as separate components in example configurations may be implemented as a combined structure or component. Similarly, structures and function presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the function of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of function are envisioned and may fall within a scope of various embodiments of the present disclosure. In general, structures and function presented as separate resources in the example configurations may be implemented as a combined structure or resource. Similarly, structures and function presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for orchestrating multiple artificial intelligence (AI) agents, comprising:
    a unified user interface for receiving a user request in one of a plurality of formats;
    a Large Language Model (LLM) configured to extract user intent from the received user request;
    a domain-specific database constructed based on domain-specific materials;
    a plurality of AI agents instantiated as containerized instances within a cloud computing environment, wherein:
        a first subset of the plurality of AI agents is maintained in an active state, each provisioned with processor cycles, memory, and network bandwidth to handle real-time user requests; and
        a second subset of the plurality of AI agents is maintained in an inactive state, wherein execution containers or virtual machines for the second subset of the plurality of AI agents require initialization before invocation;
    a model orchestration subsystem implemented as software instructions executable by one or more processors, the model orchestration subsystem configured to:
        determine, based on the extracted user intent, whether the received user request needs to be processed locally using the domain-specific database or by invoking one or more of the plurality of AI agents;
        in response to the received user request being processed by invoking one or more of the plurality of AI agents
            identify one or more candidate AI agents from the plurality of AI agents based on the extracted user intent;
            retrieve model metrics of the one or more candidate AI agents, wherein the retrieved model metrics of candidate AI agents in the active state include real-time model metrics, the retrieved model metrics of candidate AI agents in the inactive state include historical model metrics;

identify one or more target AI agents from the one or more candidate AI agents based on the retrieved model metrics;

for a first target AI agent of the one or more target AI agents, determine whether the first target AI agent is in an active or inactive state;

in response to the first target AI agent being in an inactive state, initiate a spin-up process comprising:

provisioning the processor cycles, memory, and network bandwidth for the first target AI agent using a cloud-based resource manager of the cloud computing environment;

instantiating a containerized execution environment associated with the first target AI agent using the provisioned processor cycles, memory, and network bandwidth for the first target AI agent;

loading a pre-trained model of the first target AI agent into the instantiated containerized execution environment;

monitoring an initialization state of the first target AI agent using system telemetry data until the first target AI agent reaches a ready state;

in response to the first target AI agent being in an active state or upon successful initialization of an inactive target AI agent, construct and send one or more prompts to the one or more target AI agents;

generate a response based on returned data from the one or more target AI agents;

return the generated response through the unified user interface;

for a second target AI agent of the identified one or more target AI agents that is in active state, determining whether the real-time metrics of the second target AI agent indicate a degrading trend toward a predefined threshold;

preemptively spin-up another instance of the second target AI agent in the cloud computing environment by provisioning the processor cycles, memory, and network bandwidth for the second target AI agent and instantiating a containerized execution environment associated with the second target AI agent using the provisioned processor cycles, memory, and network bandwidth for the second target AI agent; and execute automatic load-balancing among all active instances of the second target AI agent.

2. The system of claim 1, wherein in response to the received user request being processed locally, the model orchestration subsystem is further configured to:

construct, using the LLM, a database query based on the received user request, execute the constructed database query against the domain-specific database to obtain a query result, construct, using the LLM, a local response based on the obtained query result in natural language, and return the local response through the unified user interface.

3. The system of claim 1, wherein the automatic load-balancing comprises:

retrieving real-time system telemetry including response latency, request queue length, throughput, and resource utilization of each active instance of the second target AI agent; and based on the retrieved real-time system telemetry, reconfiguring API gateway load distribution settings or dynamically reallocating AI inference endpoints to redistribute processing loads across active instances of the second target AI agent.

4. The system of claim 1, further comprising:

a translation layer configured to standardize input and output schemas for interacting with the plurality of AI agents, wherein the model orchestration subsystem uses the translation layer to send the one or more prompts to the one or more target AI agents, and receive the returned data from the one or more target AI agents.

5. The system of claim 1, wherein the plurality of AI agents comprises:

a plurality of AI agents trained to perform a same functionality using different base models;

a plurality of AI agents trained to process data in the plurality of formats, comprising text, voice, and image; and a plurality of AI agents trained to handle different aspects of the received user request.

6. The system of claim 1, further comprising a training module for training the LLM to extract the user intent from the received user request, the training module configured to:

receive a dataset comprising a plurality of user queries and corresponding ground truth intent labels, wherein the dataset represents a diverse range of user intentions and query formats relevant to a target domain;

preprocess the received dataset to normalize query formats, tokenize textual data, or remove inconsistencies, thereby generating a standardized dataset for training; and fine-tune a pre-trained LLM using the standardized dataset, wherein the training module optimizes model parameters of the pre-trained LLM to minimize a loss function representing a difference between predicted intent labels and corresponding ground truth intent labels, and adapts the pre-trained LLM to nuances of domain-specific intent extraction tasks.

7. The system of claim 6, wherein the LLM is further augmented by using a retrieval-augmented generation (RAG) database, and the training module is further configured to:

create embeddings for each user query and corresponding intent label in the standardized dataset, wherein the embeddings encode semantic relationships between queries and intents; and store the embeddings in a vector database to facilitate similarity-based retrieval of relevant intent examples during inference, generate an embedding representing a semantic meaning of a training user query, retrieve, from the vector database, a set of intent examples similar to the training user query based on a similarity metric, determine performance metrics of the LLM based on the extracted user intent and the retrieved set of intent examples, wherein the performance metrics comprise precision, recall, or F1-score; and iteratively refine the LLM based on the performance metrics.

8. The system of claim 1, wherein the real-time model metrics of the one or more candidate AI agents comprise one or more of the following:
  real-time latency, representing a response time of each candidate AI agent for processing a request;
  cost per query, representing a computational or monetary cost associated with invoking each candidate AI agent;
  load status, representing an operational uptime or current load condition of each candidate AI agent;
  throughput, indicating a number of queries each candidate AI agent processes per unit time; and
  historical response quality, based on previously observed performance metrics, including one or more the following: user feedback, error rates, or relevance of responses.

9. The system of claim 1, wherein to generate the response based on returned data from the one or more target AI agents, the model orchestration subsystem is further configured to:
  evaluate the returned data from the one or more target AI agents using one or more criteria, wherein the one or more criteria comprise relevance to the received user request, confidence scores associated with the returned data, response latency, and output completeness, and
  select the evaluated returned data with a highest evaluation score as the response.

10. The system of claim 1, wherein to generate the response based on returned data from the one or more target AI agents, the model orchestration subsystem is further configured to:
  combine the returned data from the one or more target AI agents by identifying and removing redundant information across the returned data, aggregating non-overlapping portions, and synthesizing a unified response using the LLM.

11. The system of claim 1, wherein to identify the one or more candidate AI agents from the plurality of AI agents based on the extracted user intent, the model orchestration subsystem is further configured to:
  generate a vectorized representation of the extracted user intent to encode semantic meaning of the extracted user intent;
  retrieve vectorized representations of functional descriptions associated with each of the plurality of AI agents, wherein the functional descriptions include tasks supported by each AI agent;
  perform a vector-based similarity search based on the vectorized representation of the extracted user intent and the vectorized representations of the functional descriptions to obtain similarity scores for the plurality of AI agents; and
  identify AI agents having the similarity scores exceeding a predefined threshold as the candidate AI agents, wherein the candidate AI agents are ranked based on the similarity scores.

12. The system of claim 1, wherein to determine one or more target AI agents based on the retrieved model metrics, the model orchestration subsystem is further configured to:
  categorize, using the LLM, the received user request into one of plurality of context categories, each context category being indicative of at least one of task urgency or task complexity;
  adjust weights of the real-time model metrics based on the context category of the received user request, such that one or more of the real-time model metrics are dynamically prioritized; and
  select the one or more target AI agents based on the weighted real-time model metrics.

13. The system of claim 12, wherein:
  in response to the context category of the received user request indicating a real-time interaction that requires immediate responses, a latency metric is prioritized over a cost-efficiency metric and an accuracy metric;
  in response to the context category of the received user request indicating a delayed or asynchronous task, the cost-efficiency metric is prioritized over the latency metric, while maintaining a minimum accuracy threshold of the accuracy metric; and
  in response to the context category of the received user request indicating a refinement task or user correction of a previously generated result, the accuracy metric is prioritized over the latency metric and the cost-efficiency metric.

14. The system of claim 12, wherein to categorize the received user request into one of plurality of context categories, the model orchestration subsystem is further configured to:
  analyze, using a machine learning-based intent classification model, one or more features of the received user request, the one or more features comprising textual content, input modality, temporal patterns, or user interaction history;
  extract, using the LLM, semantic and contextual embeddings from the received user request to identify latent task-specific attributes;
  train a context classification model based on a dataset comprising labeled user requests associated with corresponding context categories;
  predict, using the trained context classification model, a context category for the received user request based on the analyzed features and extracted embeddings; and
  provide the predicted context category as input to the model orchestration subsystem for scaling the real-time model metrics.

15. A method for orchestrating multiple artificial intelligence (AI) agents, the method comprising:
  receiving, via a unified user interface, a user request in one of a plurality of formats;
  extracting, using a Large Language Model (LLM), user intent from the received user request;
  determining, based on the extracted user intent, whether the received user request is to be processed locally using a domain-specific database or by invoking one or more of a plurality of AI agents each instantiated as containerized instances within a cloud computing environment, wherein a subset of the plurality of AI agents is maintained in an active state, each provisioned with processor cycles, memory, and network bandwidth to handle real-time user requests, and another subset of the plurality of AI agents is maintained in an inactive state, wherein execution containers or virtual machines for the inactive AI agents require initialization before invocation;
  in response to determining that the received user request is to be processed by invoking the one or more AI agents, identifying one or more candidate AI agents based on the extracted user intent;
  retrieving model metrics of the one or more candidate AI agents, wherein the retrieved model metrics of candidate AI agents in an active state include real-time model metrics and the retrieved model metrics of candidate AI agents in an inactive state include historical model metrics;

identifying one or more target AI agents from the one or more candidate AI agents based on the retrieved model metrics;
for a first target AI agent in the identified target AI agents, determining whether the first target AI agent is in an active state or an inactive state;
in response to determining that the first target AI agent is in an inactive state, initiating a spin-up process by:
provisioning processor cycles, memory, and network bandwidth for the first target AI agent using a cloud-based resource manager of the cloud computing environment;
instantiating a containerized execution environment associated with the first target AI agent using the provisioned processor cycles, memory, and network bandwidth;
loading a pre-trained model of the first target AI agent into the instantiated execution environment; and
monitoring an initialization state of the first target AI agent using system telemetry data until the first target AI agent reaches a ready state;
in response to the first target AI agent being in an active state or upon successful initialization of the first target AI agent from an inactive state, constructing and sending one or more prompts to the identified one or more target AI agents;
generating a response based on returned data from the identified one or more target AI agents;
returning the response through the unified user interface;
for a second target AI agent among the identified one or more target AI agents that is in an active state, determining whether real-time model metrics of the second target AI agent indicate a degrading trend toward a predefined threshold;
in response to detecting the degrading trend, preemptively initiating the spin-up of an additional instance of the second target AI agent in the cloud computing environment by:
provisioning processor cycles, memory, and network bandwidth for the additional instance of the second target AI agent;
instantiating a containerized execution environment associated with the additional instance of the second target AI agent using the provisioned processor cycles, memory, and network bandwidth; and
executing automatic load-balancing among all active instances of the second target AI agent.

16. The method of claim 15, further comprising:
in response to the received user request being processed locally, constructing, using the LLM, a database query based on the received user request,
executing the database query against the domain-specific database to obtain a query result, and
constructing, using the LLM, the response based on the query result in natural language.

17. The method of claim 15, wherein the automatic load-balancing comprises:
retrieving real-time system telemetry including response latency, request queue length, throughput, and resource utilization of each active instance of the second target AI agent; and
based on the retrieved real-time system telemetry, reconfiguring API gateway load distribution settings or dynamically reallocating AI inference endpoints to redistribute processing loads across active instances of the second target AI agent.

18. The method of claim 15, wherein the real-time model metrics of the one or more candidate AI agents comprise one or more of the following:
real-time latency, representing a response time of each candidate AI agent for processing a request;
cost per query, representing a computational or monetary cost associated with invoking each candidate AI agent;
availability status, representing an operational uptime or current load condition of each candidate AI agent;
throughput, indicating a number of queries each candidate AI agent processes per unit time; and
historical response quality, based on previously observed performance metrics, including one or more of the following: user feedback, error rates, or relevance of responses.

19. The method of claim 15, wherein the identifying one or more candidate AI agents from the plurality of AI agents based on the extracted user intent comprises:
generating a vectorized representation of the extracted user intent to encode semantic meaning;
retrieving vectorized representations of functional descriptions associated with each of the plurality of AI agents, wherein the functional descriptions include tasks supported by each AI agent;
performing a vector-based similarity search based on the vectorized representation of the extracted user intent and the vectorized representations of the functional descriptions to obtain similarity scores for the plurality of AI agents; and
identifying AI agents having the similarity scores exceeding a predefined threshold as the candidate AI agents, wherein the candidate AI agents are ranked based on the similarity scores.

20. A non-transitory computer readable storage medium storing instructions that, when executed by a computing device, cause the computing device to perform operations comprising:
receiving, via a unified user interface, a user request in one of a plurality of formats;
extracting, using a Large Language Model (LLM), user intent from the received user request;
determining, based on the extracted user intent, whether the received user request is to be processed locally using a domain-specific database or by invoking one or more of a plurality of AI agents each instantiated as containerized instances within a cloud computing environment, wherein a subset of the plurality of AI agents is maintained in an active state, each provisioned with processor cycles, memory, and network bandwidth to handle real-time user requests, and another subset of the plurality of AI agents is maintained in an inactive state, wherein execution containers or virtual machines for the inactive AI agents require initialization before invocation;
in response to determining that the received user request is to be processed by invoking the one or more AI agents, identifying one or more candidate AI agents based on the extracted user intent;
retrieving model metrics of the one or more candidate AI agents, wherein the retrieved model metrics of candidate AI agents in an active state include real-time model metrics and the retrieved model metrics of candidate AI agents in an inactive state include historical model metrics;
identifying one or more target AI agents from the one or more candidate AI agents based on the retrieved model metrics;

for a first target AI agent in the identified target AI agents, determining whether the first target AI agent is in an active state or an inactive state;
in response to determining that the first target AI agent is in an inactive state, initiating a spin-up process by:
 provisioning processor cycles, memory, and network bandwidth for the first target AI agent using a cloud-based resource manager of the cloud computing environment;
 instantiating a containerized execution environment associated with the first target AI agent using the provisioned processor cycles, memory, and network bandwidth;
 loading a pre-trained model of the first target AI agent into the instantiated execution environment; and
 monitoring an initialization state of the first target AI agent using system telemetry data until the first target AI agent reaches a ready state;
in response to the first target AI agent being in an active state or upon successful initialization of the first target AI agent from an inactive state, constructing and sending one or more prompts to the identified one or more target AI agents;
generating a response based on returned data from the identified one or more target AI agents;
returning the response through the unified user interface;
for a second target AI agent among the identified one or more target AI agents that is in an active state, determining whether real-time model metrics of the second target AI agent indicate a degrading trend toward a predefined threshold;
in response to detecting the degrading trend, preemptively initiating the spin-up of an additional instance of the second target AI agent in the cloud computing environment by:
 provisioning processor cycles, memory, and network bandwidth for the additional instance of the second target AI agent;
 instantiating a containerized execution environment associated with the additional instance of the second target AI agent using the provisioned processor cycles, memory, and network bandwidth; and
executing automatic load-balancing among all active instances of the second target AI agent.

* * * * *